56. HARVESTERS
[74] Thrashe.
CLASSIFICATION
9793 +
DIVISION
9793 X
HIRAM MOORE & JOHN HASCALL'S
Machine for Mowing, Thrashing & Winnowing Grain
6-28-1836.
Patented 28th June 1836
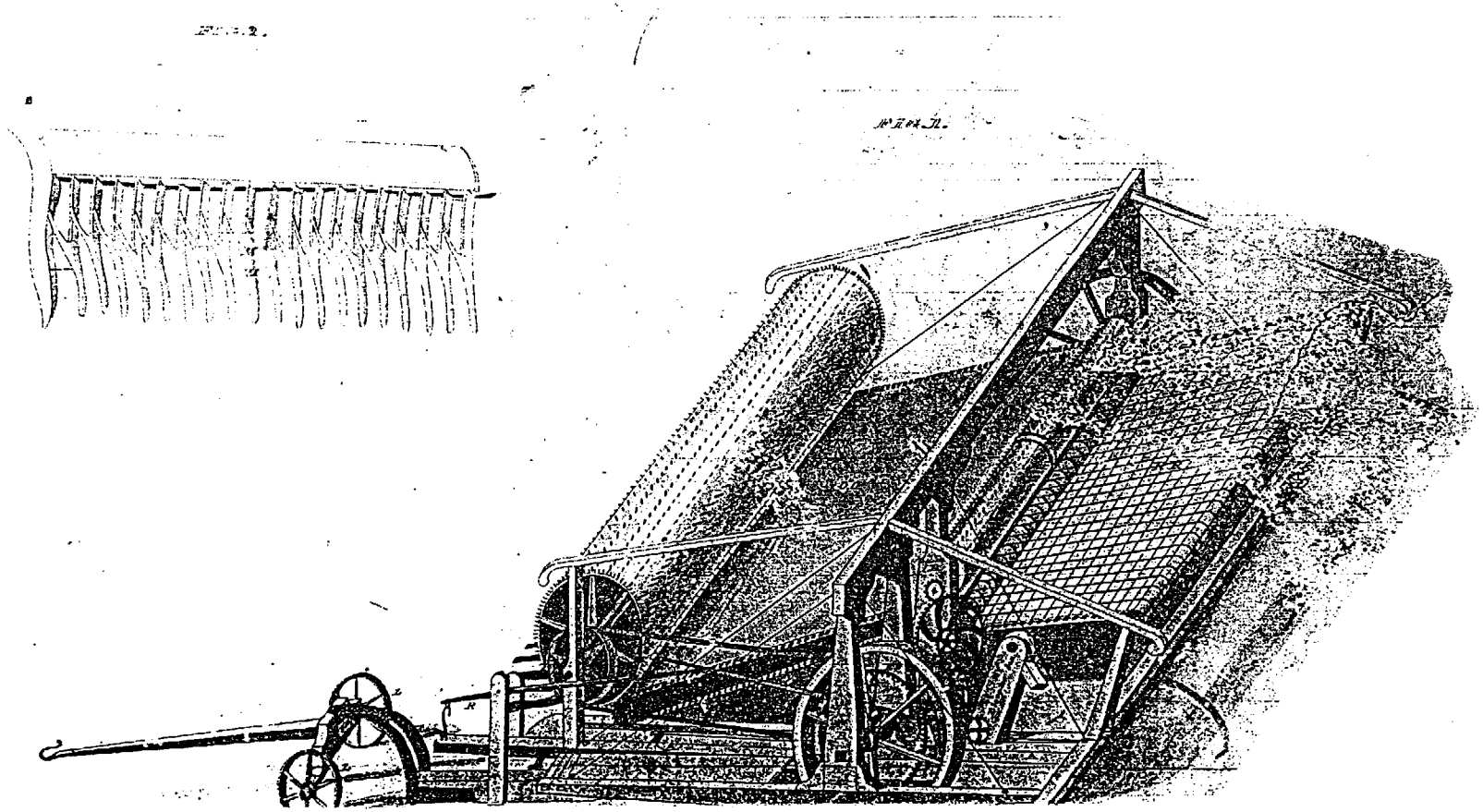

Hiram Moore & John Hascall of Kalamazoo Co. Michig.

Letters Patent

The Schedule referred to in these Letters Patent and making part of the same containing a description in the words of the said Hiram Moore and John Hascall themselves of their improvement in the Harvesting machine for mowing Threshing and winnowing grain at one operation.

To all whom ~~whom~~ it may concern. Be it known that We Hiram Moore and John Hascall of Kalamazoo County Michigan have invented certain improvements in the machinery for Harvesting grain by means of which wheat or other grain may be cut, thrashed, and winnowed; each of the operations going on simultaneously. the whole of the necessary motions being derived from the animal or other power employed to propel the machine. And we do hereby declare that the following is a full and exact description thereof. reference being had to the drawings which accompany... and make a part of this Specification In describing this machine, the dimensions which ... we shall give are taken from one which we have constructed, and which we have found to answer well in practice. It will be manifest however that these dimensions are not to be considered as absolute, but merely as an approximate guide to others any variation in this particular not changing the character of the machine.

The mode of gearing also and the number of teeth in the wheels employed the substitution of straps or belts for geared wheels may be resorted to according to the fancy or preference of the person constructing it A In fig 1 is the frame which is to support the whole structure and is seventeen feet long and fifteen broad from outside to outside. B. are uprights attached to the frame or platform and connected at top by the cap piece C. The wheels D bear upon the ground like cart wheels and by their friction give motion to the cutting Thrashing and winnowing apparatus whenever the machine is drawn forward. These wheels are seven feet in diameter and the felloe of that which carries the grain

240.

is broad and should it be found liable to slide on the ground is to be armed with
spikes projecting from its rim which will prevent this from taking place.
The gudgeon of this wheel is fixed firmly in its hub and revolves in
boxes in the uprights B. The other wheel D turns on an iron axletree
firmly attached to one of the uprights B. E is a cog wheel four feet and
four inches in diameter and gears into a pinion F about eleven inches
in diameter. The wheel E is attached to the spokes of the wheel D and
and the gudgeon of the pinion may be supported by a stud or brace attach-
ed to the frame through the intermedium of this pinion the other parts
of the machinery receive their motions and as it is necessary to allow the
machines to be drawn forward while the operating parts are at rest
this pinion is thrown out of and into gear by means of a forked lever
G in a manner well known to machinist. H is a band wheel on
the same shaft with the pinion F and is three feet in diameter. I
is what we denominate the gathering cylinder to be presently descri-
bed. This gathering cylinder is turned by a band H as seen in the
drawing which band must be crossed when the pinion F is geared
upon the outside of the wheel E when the machine is drawn by ani-
mal power the shafts or pole being attached to the frame at K is con-
nected with the fore running wheels L about two feet in diameter or
a small sled or sleigh may be substituted for these fore running whe
Fig 2. shows the cutting part of the apparatus which in fig 1 is hidden
by the gathering cylinder. M.M. are pieces denominated fingers which may be
of wood two feet in length an inch thick and three or four inches deep
they project from the front of the platform and are pointed so as read-
ily to admit the stalks or straws of the grain to pass between them up
to the cutter or cutters. The cutter may be made as follows. There may be
a fixed plate of steel extending along and projecting from the front of the plat
form or frame immediately under through or on top of the inner ends of the
fingers having pointed teeth, resembling saw teeth with a second steel plate
furnished with similar teeth made to vibrate longitudinally on the former by
means of a crank or otherwise so as to cut the stalks or straws between them
or the vibrating teeth may be made to turn on pins individually like scis one sliding rod giving motion to the whole. This mode of constructing the cut
ter somewhat resembles those already in use for cutting grass or grain
(We do not however prefer either of these modes for constructing the cutter
believing the following, which is of our own invention, is better.
The fixed toothed plate N N may be made as described with saw teeth
and against this near the roots of the teeth a straight plate of steel is made
to vibrate longitudinally. The cutting edge of this plate is like that of a
sickle, and by aid of the gathering cylinder this cutter effects the pur
pose intended very perfectly. When the sickle edge vibrates through the
fingers the fixed plate [illegible] may be dispensed with.) The Gathering
cylinder I is four feet in diameter, twelve feet in length. From the
surface project a considerable number of pointed teeth of wood or metl
which teeth may be from two to six inches in length, from twelve to twen-
ty rows of such teeth extending along the cylinder four or six inches
asunder will be found sufficient. The cylinder is so placed that the ends
of the teeth project forward, nearly as far forward as the points of the fingers
they consequently catch hold of the heads of the grain bending it down
carrying it between the cylinder and the front of the platform and hold
ing it against the cutter, A concave is formed under this cylinder allow-
ing the teeth of the cylinder to come nearly into contact therewith.
As the cut grain is conducted back by the gathering cylinder it is deliv-
ered on to an endless revolving apron C, O. This revolving apron passes
round shafts in the usual manner. The shafts are constructed as may
be seen in the model one or both of these shafts being driven by suitable
gearing. To insure the regular motion of the apron and to keep it in its place
its edges are furnished with straps or belts of leather or other suitable
material perforated with holes which pass over the teeth of guide wheels
on the end of the revolving shafts, which shafts are constructed of round
bars of iron and between the guide wheels are filled with loose rollers
from four to eight inches in diameter, one foot in length which serve
to regulate the centre of the apron. The grain is carried upon the revolving
apron to the threshing apparatus which is constructed with a cylinder or
cylinders coupled together, with concave constructed in the usual manner We drive the thrashing cylinder by means of a spur wheel a on the same shaft
with the band wheel H. and pinion P. The gearing being such as to give to
the thrashing cylinder. the required velocity say the periphery moving at
at the rate of about five thousand feet per minute when the horses travel at
their usual speed. The thrashed grain and straw are thrown out
from between the cylinder and concave at an elevation of forty five de-
grees and strike against a cover or casing placed above them. for the pur-
pose of causing them to fall upon a sieve or a revolving screen RR made
of netting passing around rollers. which netting screen allows the grain to
fall through and delivers the straw at the back of the machine. the trough
into which the grain falls has a concave bottom for a reason which will
be apparent. instead of the netting the rollers may have numerous grooves
turned in them to receive bands of cords. The grain as it falls through
into the concave trough is winnowed by a revolving fan, and the shaft
furnished by spiral flights or scrapers. which turn near the bottom of
the concave trough carries the grain to one end where it may be raised
by elevators and be poured out into boxes or bags to be tended by an assi-
stant on the platform. These parts may be geared so as to be driven by the
spur wheel A. as will be obvious to any competent machinist. R is
a lever to raise the gathering cylinder cutting apparatus &c. when any ob-
struction or the height of the grain renders it necessary or desirable
so to do. The timber S to which the fore wheels and pole are attach-
is separate from and extends under the main frame to which it is hinged
at K near the wheel D. A person standing upon the platform and
depressing the lever R will therefore raise the parts mentioned. the stan-
dards which support its fulcrum being attached to the timber S.
If suitable teeth for thrashing are put into the gathering cylinder and
its concave the said cylinder will answer the double purpose of gather-
ing and thrashing the grain. or if said cylinder is covered with perfo-
rated sheet iron and its concave is shielded with the same it will also
answer the purpose, and in either case the other thrashing apparatus
may be dispensed with. Having thus fully described the construc-
tion and operation of our said machine We do hereby declare that we do not rest our claim to invention upon any of the parts thereof taken individually, with the exception of the gathering cylinder and sickle edged cutter operating in the manner and for the purposes described. We also claim the manner in which we have combined them with the other parts of the machinery so as to carry on the cutting thrashing and cleaning of the grain simultaneously.) Not intending however to limit ourselves to the precise manner of arranging the gearing and other minor parts as herein shown but to vary the same as we may think proper while the mode of action remains substantially the same.

Witnesses
Caleb Sherman
Henry Moore

[illegible]
Hiram Moore [illegible]
John Hascall (1843 [illegible])

(Granted June 28. 1836)